(12) United States Patent
Huang et al.

(10) Patent No.: US 11,597,143 B2
(45) Date of Patent: Mar. 7, 2023

(54) ADDITIVE MANUFACTURING PROCESS USING FUSING AND NON-FUSING PRINTING FLUIDS

(71) Applicant: HEWLETT-PACKARD DEVELOPMENT COMPANY, L.P., Houston, TX (US)

(72) Inventors: Wei Huang, Palo Alto, CA (US); Steven J. Simske, Fort Collins, CO (US); Gary J. Dispoto, Palo Alto, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 907 days.

(21) Appl. No.: 16/075,878

(22) PCT Filed: Apr. 19, 2017

(86) PCT No.: PCT/US2017/028335
§ 371 (c)(1),
(2) Date: Aug. 6, 2018

(87) PCT Pub. No.: WO2018/194583
PCT Pub. Date: Oct. 25, 2018

(65) Prior Publication Data
US 2021/0206059 A1 Jul. 8, 2021

(51) Int. Cl.
*B29C 64/165* (2017.01)
*B33Y 40/00* (2020.01)
(Continued)

(52) U.S. Cl.
CPC .......... *B29C 64/165* (2017.08); *B29C 64/393* (2017.08); *B33Y 40/00* (2014.12);
(Continued)

(58) Field of Classification Search
CPC .................................................... B29C 64/165
See application file for complete search history.

(56) References Cited

U.S. PATENT DOCUMENTS 6,966,960 B2 11/2005 Boyd et al.
9,533,526 B1 1/2017 Nevins
(Continued)

FOREIGN PATENT DOCUMENTS

WO 2015022572 A2 2/2015
WO 2015177598 A1 11/2015
(Continued)

OTHER PUBLICATIONS

Zhang et al., "3D Object Hiding Using Three-Dimensional Ptychography", Journal of Optics, vol. 18, Retrieved from Internet: http://iopscience.iop.org/article/10.1088/2040-8978/18/9/095701/meta, 2016, 14 Pages.

*Primary Examiner* — Matthew J Daniels
*Assistant Examiner* — Andrew L Swanson
(74) *Attorney, Agent, or Firm* — Shook, Hardy & Bacon, LLP

(57) ABSTRACT

In an example, a method is described that includes generating a model for fabricating an object via an additive manufacturing process. The model includes a first region defining the object and a second region defining a sacrificial artifact. The object is fabricated via the additive manufacturing process, using a fusing printing fluid. The sacrificial artifact is fabricated simultaneously with fabricating the object, via the additive manufacturing process, using a non-fusing printing fluid.

7 Claims, 5 Drawing Sheets

(51) Int. Cl.
  *B29C 64/393* (2017.01)
  *B33Y 10/00* (2015.01)
  *B33Y 30/00* (2015.01)
  *B33Y 50/02* (2015.01)

(52) U.S. Cl.
  CPC .............. *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 2003/0133822 | A1* | 7/2003 | Harryson | B22F 7/02 419/35 |
| 2004/0251574 | A1* | 12/2004 | Collins | B29C 64/165 264/113 |
| 2008/0001331 | A1* | 1/2008 | Ederer | B33Y 50/02 264/460 |
| 2010/0086721 | A1* | 4/2010 | Batchelder | B33Y 30/00 700/98 |
| 2012/0018926 | A1* | 1/2012 | Mannella | B29C 64/171 425/73 |
| 2016/0136887 | A1 | 5/2016 | Guillemette et al. | |
| 2016/0332380 | A1* | 11/2016 | De Pena | B29C 64/00 |

FOREIGN PATENT DOCUMENTS

| | | | |
|---|---|---|---|
| WO | 2016068899 | A1 | 5/2016 |
| WO | 2017012656 | A1 | 1/2017 |

\* cited by examiner

ADDITIVE MANUFACTURING PROCESS USING FUSING AND NON-FUSING PRINTING FLUIDS

BACKGROUND

Additive manufacturing processes (also referred to as "three-dimensional printing" processes) are often used to fabricate objects including three-dimensional objects. In an additive manufacturing process, a computer controls the spreading of powder and jetting of printing fluid to form successive layers of material according to a digital model of an object. The printing fluid may contain a fusing agent that causes the powder to fuse under certain conditions, such as exposure to energy. Thus, as the successive layers fuse to each other, a three-dimensional object is formed. Such processes may be used to fabricate a variety of three-dimensional objects, including functional and aesthetic machine components, consumer and industrial products that are produced in short runs (e.g., less than one thousand units), and customized high-value-products that may be one-of-a-kind.

DETAILED DESCRIPTION

Figure 1:
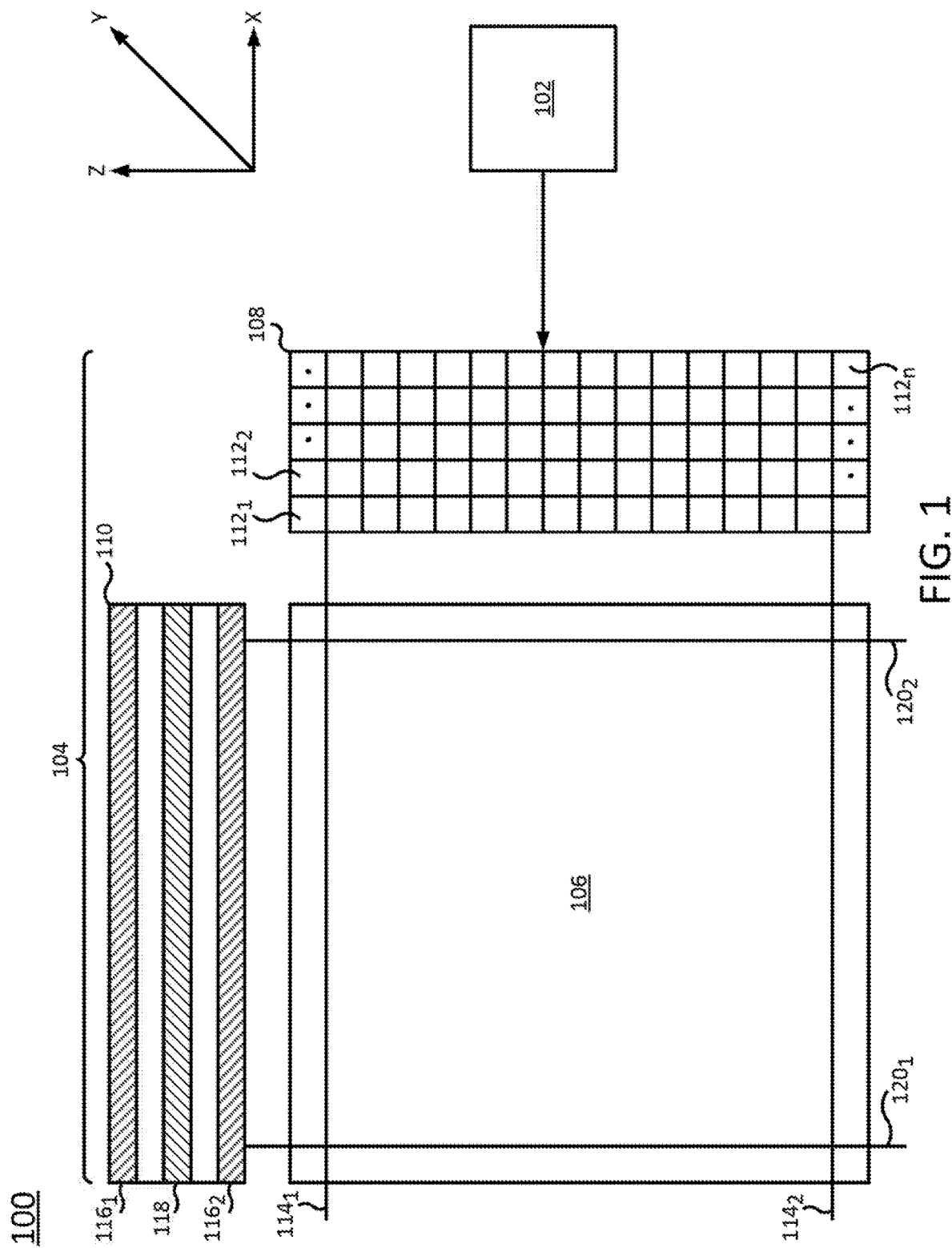
FIG. 1 illustrates a block diagram of a top view of an example system of the present disclosure.

The present disclosure broadly describes an apparatus, method, and non-transitory computer-readable medium for additive manufacturing using fusing and non-fusing printing fluids (or using binding and non-binding printing fluids, where the additive manufacturing process comprises a binder jetting process). As discussed above, additive manufacturing processes may be used to fabricate a variety of objects (e.g., three-dimensional, two-dimensional, and 2.5 dimensional objects including surface finishings or coatings), including functional and aesthetic machine components, consumer and industrial products that are produced in short runs (e.g., less than one thousand units), and customized high-value products that may be one-of-a-kind. The design information (e.g., geometry, color, etc.) for some of these items may be considered proprietary. For instance, intellectual property, personal information, or even sensitive military data can be extracted in some cases simply from the design information, which may be exposed during the manufacturing process due to the configuration of the manufacturing hardware (e.g., as in the case where the build bed of the additive manufacturing system is open for viewing). Thus, an unauthorized individual may be able to reverse engineer all or part of an object by recording the manufacturing process, or even just by catching a glimpse of the object during manufacturing.

Examples of the present disclosure use a combination of fusing and non-fusing printing fluids (e.g., inks) to disguise at least some of the design information about an object being fabricated via an additive manufacturing process. In one example, a model (e.g., one or more slice images) is generated that includes the object to be fabricated, as well as at least one sacrificial artifact. The regions of the model defining the object to be fabricated are subsequently fabricated using the fusing printing fluids, while the regions of the model defining the sacrificial artifact are fabricated using the non-fusing printing fluids. In one example, the fusing and non-fusing printing fluids are the same color, and the sacrificial artifact comprises an artifact that directly touches and at least partially encloses the object to be fabricated. The sacrificial artifact obscures the exact shape and dimensions of the object to be fabricated during the manufacturing process, but does not fuse or bind to the object upon completion of the manufacturing process. Thus, non-fusing printing fluids do not interfere with fabrication of the object or alter the final fabricated product. Moreover, because the object and the sacrificial artifact are printed at the same time, the manufacturing time is not extended, and additional manufacturing cost is therefore minimized.

Within the context of the present disclosure, the term "sacrificial" is meant to indicate an artifact that is fabricated simultaneously with the object being fabricated, but is not physically part of the final object. Despite the description of this this artifact as sacrificial, the materials used to fabricate the artifact may be recyclable and/or reusable in subsequent additive manufacturing processes.

Examples of the present disclosure can also be extended in all three dimensions. For instance, although examples of the present disclosure describe an additive manufacturing process based on slice images that are reconstructed in the x and z dimensions of the three-dimensional coordinate plane, entire disguised images can also be fabricated along the y axis (i.e., in the build direction). That is, the geometry of the object being fabricated can also be disguised in the y dimension using non-fusing printing fluids to generate sacrificial artifacts.

Although examples of the disclosure are described within the context of an inkjet-style additive manufacturing system, the described examples may be equally applicable to other types of additive manufacturing systems, including systems based on three-dimensional binder jetting. Thus, any references to "fusing" printing fluids could be applicable to "binding" printing fluids as well, and any references to "non-fusing" printing fluids could also be applicable to "non-binding" printing fluids.

FIG. 1 illustrates a block diagram of a top view of an example system 100 of the present disclosure. In one example, the system 100 is a fluid ejection system, such as an additive manufacturing system using inkjet technology. The system 100 generally includes an image processing system 102 and a print engine 104. The image processing system 102 and print engine 104 work together to fabricate a three-dimensional object via selective addition of a material, such as a fusing agent.

In one example, the image processing system 102 comprises a computing device (e.g., a general purpose computing device or a special purpose computing device) that stores a model of an object to be fabricated. In one example, the object is fabricated by the print engine 104 in a series of layers that are fused together. Thus, the model of the object may comprises a plurality of cross sections or slice images that are reproduced by the print engine 104 in printing fluid, where each slice image corresponds to one or more of the layers of the object. The image processing system may or may not include an application for generating and/or modifying the model.

The image processing system 102 sends electronic signals to the print engine 104. These electronic signals, in turn, drive the components of the print engine 104 (discussed in further detail below) to cooperate to fabricate the object. Although the image processing system 102 is illustrated as being external or separate from the print engine 104, some image processing system functions may be performed by the image processing system 102. Thus, the system illustrated in FIG. 1 shows one example configuration that may be used to implement the functionality of the image processing system 102 and the print engine 104.

In one example, the print engine 104 comprises a build bed 106, a movable fluid ejection array 108, and a moveable curing array 110. The build bed comprises a working area upon which the object is fabricated, and may comprise a substantially flat, planar space.

The moveable fluid ejection array 108 includes a plurality of fluid ejection modules $112_1$-$112_n$ (hereinafter collectively referred to as "fluid ejection modules 112"), each of which may be controlled by a respective fluid ejection module controller (not shown) that receives electronic signals from the image processing system 102. Each fluid ejection module 112 may include a plurality of fluid ejection devices (e.g., dies, pens, nozzles, or the like) for ejecting printing fluid (e.g., fusing agents, non-fusing agents, detailing agents). The fluid ejection devices may be of the type used in high-speed commercial inkjet printing presses. In one example, at first plurality of the fluid ejection devices ejects fusing printing fluids (e.g., fluids that contain a fusing agent that causes a powder to fuse together or solidify when exposed to a quantity of energy), while a second plurality of the fluid ejection devices ejects non-fusing printing fluids (e.g., fluids that contain non-fusing agents that prevent the powder from fully fusing together or solidifying when exposed to the quantity of energy). The non-fusing printing fluids may include cooling agents, agents that can chemically or physically prevent or weaken the fusing process, or agents that can break down the fused solid material after fusing. The non-fusing printing fluids could also include fluids that react differentially to subsequent finishing processes (e.g., ultrasound, shaking, application of specific gases, etc.). A third plurality of the fluid ejection devices may eject a detailing agent. However, in some examples, the non-fusing printing fluids may additionally serve as detailing agents.

In one example, the moveable fluid ejection array 108 is moveable in at least two dimensions (or, along two axes of a three-dimensional coordinate plane). In the example illustrated in FIG. 1, the moveable fluid ejection array 108 is moveable along the x dimension (e.g., from left to right across the page of FIG. 1, or along the dimension parallel to the plane of the build bed 106) and along the y dimension (e.g., into the page of FIG. 1, or along the dimension perpendicular to the plane of the build bed 106). In this case, a first set of tracks $114_1$ and $114_2$ supports the moveable fluid ejection array 108 for movement along the x dimension, while a second set of tracks (not shown) supports the moveable fluid ejection array 108 for movement along the y dimension.

The moveable curing array 110 includes at least one emitter $116_1$-$116_n$ (hereinafter collectively referred to as "emitters 116") for emitting energy (e.g., heat, light, acoustic energy, etc.), and a material coater 118 (e.g., a blade or roller) for dispensing and spreading a coating material. The emitter(s) 116 and material coater 118 may be arranged as alternating modules on the surface of the moveable curing array 110.

The moveable curing array 110 is moveable in at least two dimensions (or, along two axes of a three-dimensional coordinate plane). In the example illustrated in FIG. 1, the moveable curing array 110 is moveable along the z dimension (e.g., from top to bottom across the page of FIG. 1, or along the dimension parallel to the plane of the build bed 106 and perpendicular to the dimension along which the moveable fluid ejection array 108 moves) and along the y dimension (e.g., into the page of FIG. 1, or along the dimension perpendicular to the plane of the build bed 106). In this case, a first set of tracks $120_1$ and $120_2$ supports the moveable curing array 110 for movement along the z dimension, while a second set of tracks (not shown) supports the moveable curing array 110 for movement along the y dimension.

In operation, a thin base layer of material (e.g., powder) is coated on the build bed 106 by the moveable curing array 110 (e.g., by the material coater 118) moving in a first direction along the z dimension. Next, the moveable fluid ejection array 108 is moved to the appropriate height (e.g., according to the object model) along the y dimension, and then passes across the build bed 106 in a first direction along the x dimension. As the moveable fluid ejection array 108 passes across the build bed, it lays down a first layer of printing fluid over at least a portion of the powder. The first layer of printing fluid may comprise both fusing and non-fusing printing fluids as well as detailing agents, according to a first slice image. The moveable curing array 110 is then moved to the appropriate height (e.g., according to the object model) along the y dimension, and then passes across the build bed 106 in a second direction (e.g., opposite the first direction) along the z dimension. As the moveable curing array 110 passes across the build bed, it emits energy. Application of the energy to the first layer of printing fluid causes the fusing printing fluids in the first layer of printing fluid to absorb the energy, which in turn causes at least some of the powder to fuse or solidify into a first layer of the object.

The moveable fluid ejection array 108 and the moveable curing array 110 may make subsequent passes, alternating as in the first pass, and reversing direction each time along the x and z dimensions, respectively. Each pass may also move the height of the moveable fluid ejection array 108 and the moveable curing array 110 higher along the y dimension. These subsequent passes fabricate additional layer of the object, which fuse to the prior layers, until the object is fully fabricated.

As discussed above, the system 100 illustrates one example of an additive manufacturing system that uses inkjet technology. Other additive manufacturing systems may use different types of technology that include additional components, or omit some of the components illustrated in FIG. 1. For instance, an additive manufacturing system that uses three-dimensional binder jetting technology may not include any emitters for emitting energy. However, such a system could still use a combination of binding and non-binding printing fluids to disguise an object during fabrication.

Figure 2:
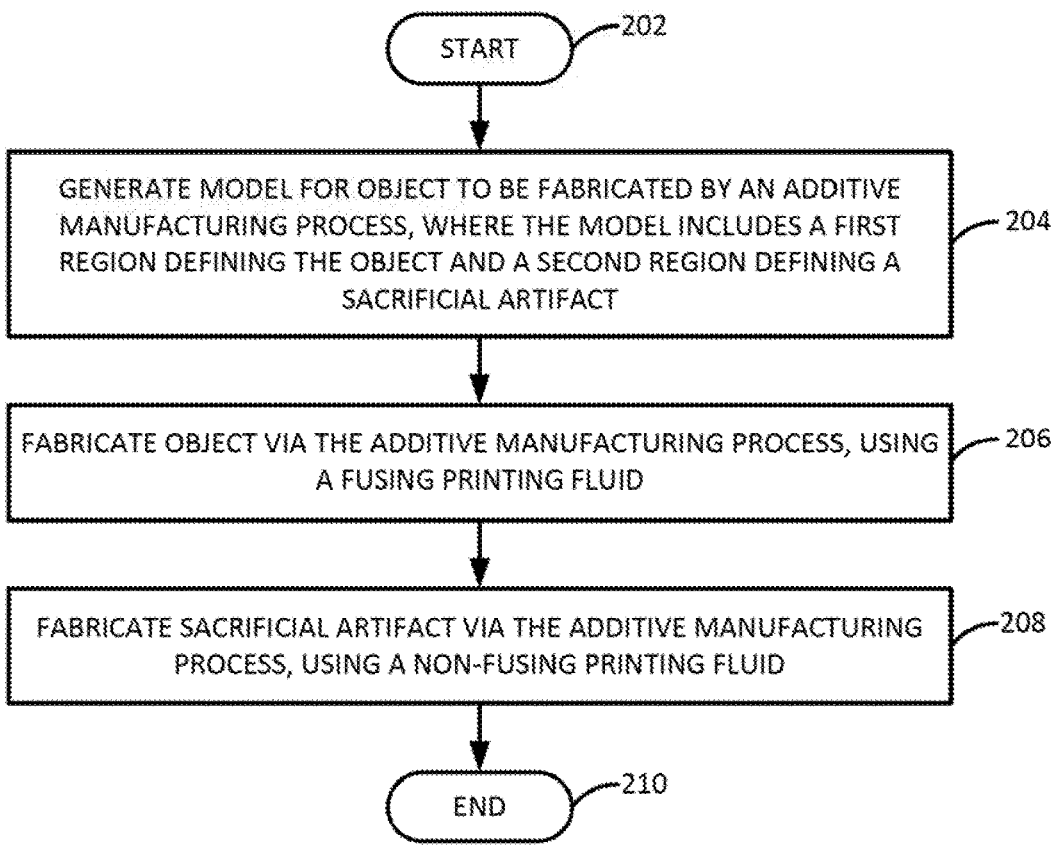
FIG. 2 illustrates a flowchart of an example method for fabricating an object via an additive manufacturing process.

FIG. 2 illustrates a flowchart of an example method 200 for fabricating an object via an additive manufacturing process. The method 200 may be performed, for example, by the system 100 illustrated in FIG. 1. As such, reference is made in the discussion of FIG. 2 to various components of the system 100 to facilitate understanding. However, the method 200 is not limited to implementation with the system illustrated in FIG. 1.

The method 200 begins in block 202. In block 204, a model is generated (e.g., using the image processing system 102) for an item to be fabricated via an additive manufacturing process. As discussed above, the model may comprise a plurality of slice images, where each slice image corresponds to one layer of the object to be fabricated. Thus, each slice image may represent a cross section of the object. In one example, at least one of the slice images includes a first region and a second region. The first region of the slice image defines a cross section of the object to be fabricated, while the second region of the slice image defines a sacrificial artifact.

Figure 3C:
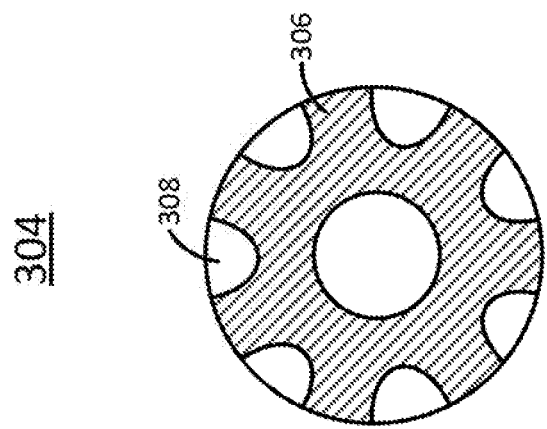
FIG. 3C illustrates an example ink distribution map corresponding to the second example slice image of FIG. 3B.
Figure 3B:
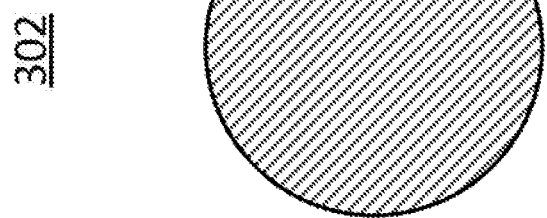
FIG. 3B illustrates a second example slice image of the object of FIG. 3A.
Figure 3A:
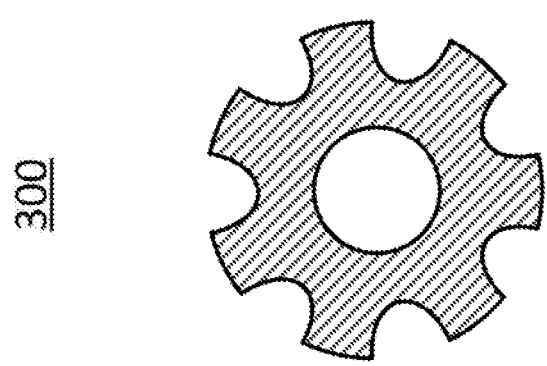
FIG. 3A illustrates a first example slice image of an object to be fabricated via an additive manufacturing process.

FIG. 3A, for instance, illustrates a first example slice image 300 of an object to be fabricated via an additive manufacturing process. In the example of FIG. 3A, the slice image 300 comprises a slice or cross section of a model of a gear. FIG. 3B illustrates a second example slice image 302 of the object of FIG. 3A. In the example of 3B, the shape and dimensions of the gear are obscured or disguised. FIG. 3C illustrates an example ink distribution map 304 corresponding to the second example slice image of FIG. 3B. As better seen in FIG. 3C, the second example slice image 302 actually comprises two regions: a first region 306 that defines the slice of the gear and a second region 308 that defines a sacrificial artifact.

Although the first region 306 and the second region 308 of the ink distribution map 304 are illustrated in different colors, this does not necessarily indicate that the first region 306 and the second region 308 are printed in different color printing fluids. Rather, it is to show the boundaries of the first region 306 and the second region 308. The first region 306 and the second region 308 could be printed in printing fluids of the same color (i.e., printing fluids that are the same color before and after fusing or binding, though the pre-fusing colors of the printing fluids may differ from the post-fusing colors due to processing), as illustrated in the second example slice image 302, so that they blend seamlessly together (i.e., without any clear visible boundaries). However, the first region 306 is printed or fabricated using a fusing printing fluid, as discussed above, while the second region 308 is printed or fabricated using a non-fusing printing fluid.

As illustrated in FIG. 3C, the first region 306 and the second region 308 physically contact each other in order to promote seamless blending of the two regions 306 and 308. In one example, the second region 308 at least partially surrounds or encompasses the first region 306. The second region 308 may take any shape, as can the resulting slice image that incorporates both the first region 306 and the second region 308 (e.g., as illustrated in FIG. 3B). For instance, the resulting slice image could take the shape of a bounding polygon, a bounding curve, or even the original slice image with some additional features.

Referring back to FIG. 2, in block 206, the object is fabricated via the additive manufacturing process, using a fusing printing fluid to render the object. As discussed above, the fusing printing fluid is a printing fluid that absorbs applied energy, which in turn raises the temperature of a powder and causes the powder to fuse together or solidify.

In block 208, the sacrificial artifact is fabricated, simultaneously with the object, via the additive manufacturing process. The sacrificial artifact, however, is rendered using a non-fusing printing fluid. As discussed above, the non-fusing printing fluid is a printing fluid that prevents the powder from fully fusing together or solidifying when exposed to energy.

In one example, the sacrificial artifact could be fabricated using a combination of fusing and non-fusing printing fluids. In this case, the portions of the sacrificial artifact that are fabricated using fusing printing fluids do not directly physically contact the object. Thus, the object is fabricated using a fusing printing fluid (e.g., in block 306), and the sacrificial artifact comprises a "buffer" portion fabricated using non-fusing printing fluid that directly physically contacts the object. Additional portions of the sacrificial artifact that directly physically contact the buffer portion (without directly physically contacting the first region) are then fabricated using the fusing printing fluid. In this way, no portions of the sacrificial artifact fuse directly to the object. Moreover, this approach may minimize contamination of the base layer material (e.g., powder) upon which the object is fabricated, thereby allowing for recycling of the base layer material in subsequent additive manufacturing processes.

The method 200 ends in block 210.

Thus, if one were to fabricate the gear of FIGS. 3A-3C according to the method 200, the first region 306 of the ink distribution map 304 would be fabricated using a fusing printing fluid, while the second region 308 of the ink distribution map 304 would be fabricated using a non-fusing printing fluid of the same color as the fusing printing fluid (e.g., as illustrated in FIG. 3B). Other slices or layers of the object would be rendered in a similar manner. The result of the additive manufacturing process would thus be the solid, three-dimensional gear, plus some amount of un-fused powder and printing fluid that does not fuse to the gear. However, during the fabrication process, the boundaries between the gear and the un-fused amounts of powder and printing fluid would be undetectable to the human eye.

In some cases, the object being fabricated may be a multi-colored object. In this case, fusing and non-fusing printing fluids of multiple colors may be used to disguise the geometry and dimensions of the multi-colored object. For example, a purple non-fusing printing fluid may be jetted adjacent to a first portion of the object that is fabricated using purple fusing printing fluid, while an orange non-fusing printing fluid may be jetted adjacent to a second portion of the object that is fabricated using orange fusing printing fluid.

In some cases, it may be desirable to apply non-fusing printing fluids on the boundaries of the object being fabricated to improve the aesthetics of the object. Often, trace amounts of powder (which is typically white or uncolored) which have not been treated with a fusing printing fluid may still fuse to the object boundaries, resulting in discoloration on the boundaries. Thus, by treating the powder around the boundaries of the object with a non-fusing printing fluid that is the same color as the fusing printing fluid, the discoloration can be minimized. Moreover, in this case, even relatively large amounts of "contamination" by the powder treated with the non-fusing printing fluid will be undetectable to the human eye.

Thus, the method 200 could be used to fabricate a part for a proprietary project. Although the part may be a standard one, the manufacturer may wish to avoid information inference from the part and may therefore choose to fabricate the part according to the method 200. In another example, the method 200 may be used to fabricate a prototype of an animated character whose design is confidential.

It should be noted that although not explicitly specified, some of the blocks, functions, or operations of the methods 200 described above may include storing, displaying and/or outputting for a particular application. In other words, any data, records, fields, and/or intermediate results discussed in the method can be stored, displayed, and/or outputted to another device depending on the particular application. Furthermore, blocks, functions, or operations in FIG. 2 that recite a determining operation, or involve a decision, do not necessarily imply that both branches of the determining operation are practiced.

Figure 4A:
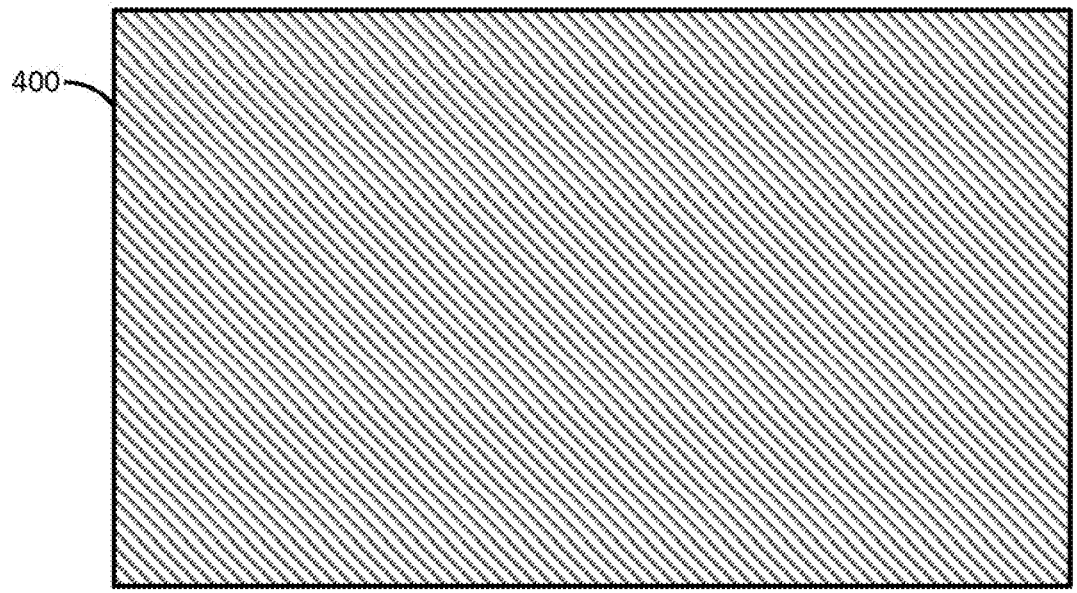
FIG. 4A illustrates an example slice image 400 for use in fabricating a plurality of objects.
Figure 4B:
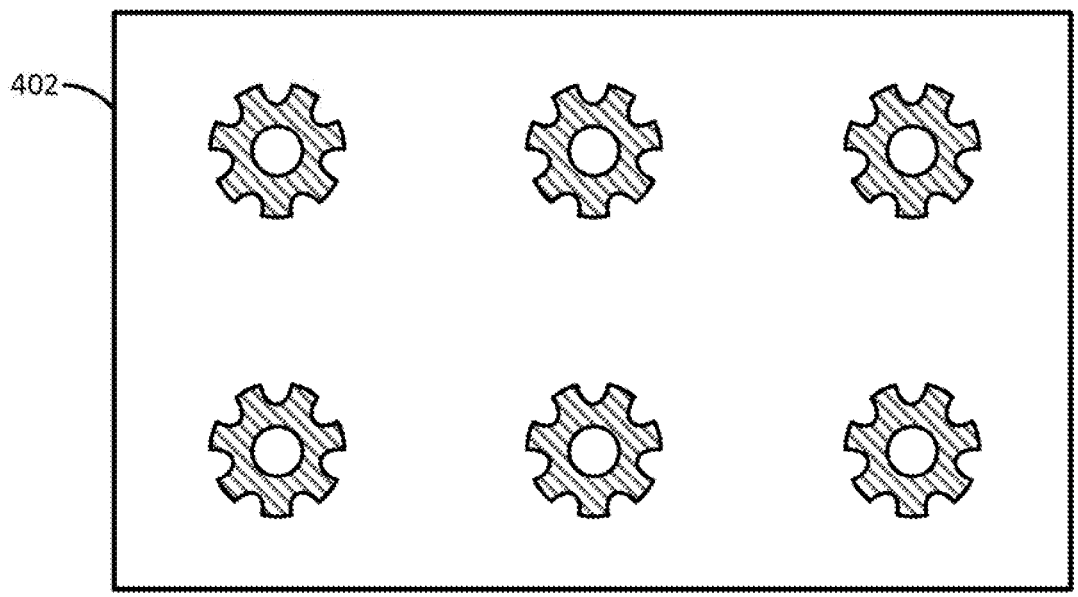
FIG. 4B illustrates an example ink distribution map corresponding to the slice image of FIG. 4A.

Examples of the present disclosure could also be used to disguise the quantity of a part being fabricated in a batch, where the geometry of the part may or may not be known. FIG. 4A, for instance, illustrates an example slice image 400 for use in fabricating a plurality of objects (e.g., gears). FIG. 4B illustrates an example ink distribution map 402 corresponding to the slice image 400 of FIG. 4A. As illustrated, the number of objects (e.g., six gears) being fabricated can be obscured in the slice image 400 by printing a sacrificial artifact that surrounds the objects, using a non-fusing printing fluid of the same color as the fusing printing fluid used to fabricate the objects.

Further examples of the present disclosure can be extended in the direction of build (e.g., along the y dimension of FIG. 1). In this case, entire sacrificial layers may be fabricated between adjacent non-sacrificial layers of the object in order to disguise the dimensions and geometry of the object in the y dimension.

Figure 5:
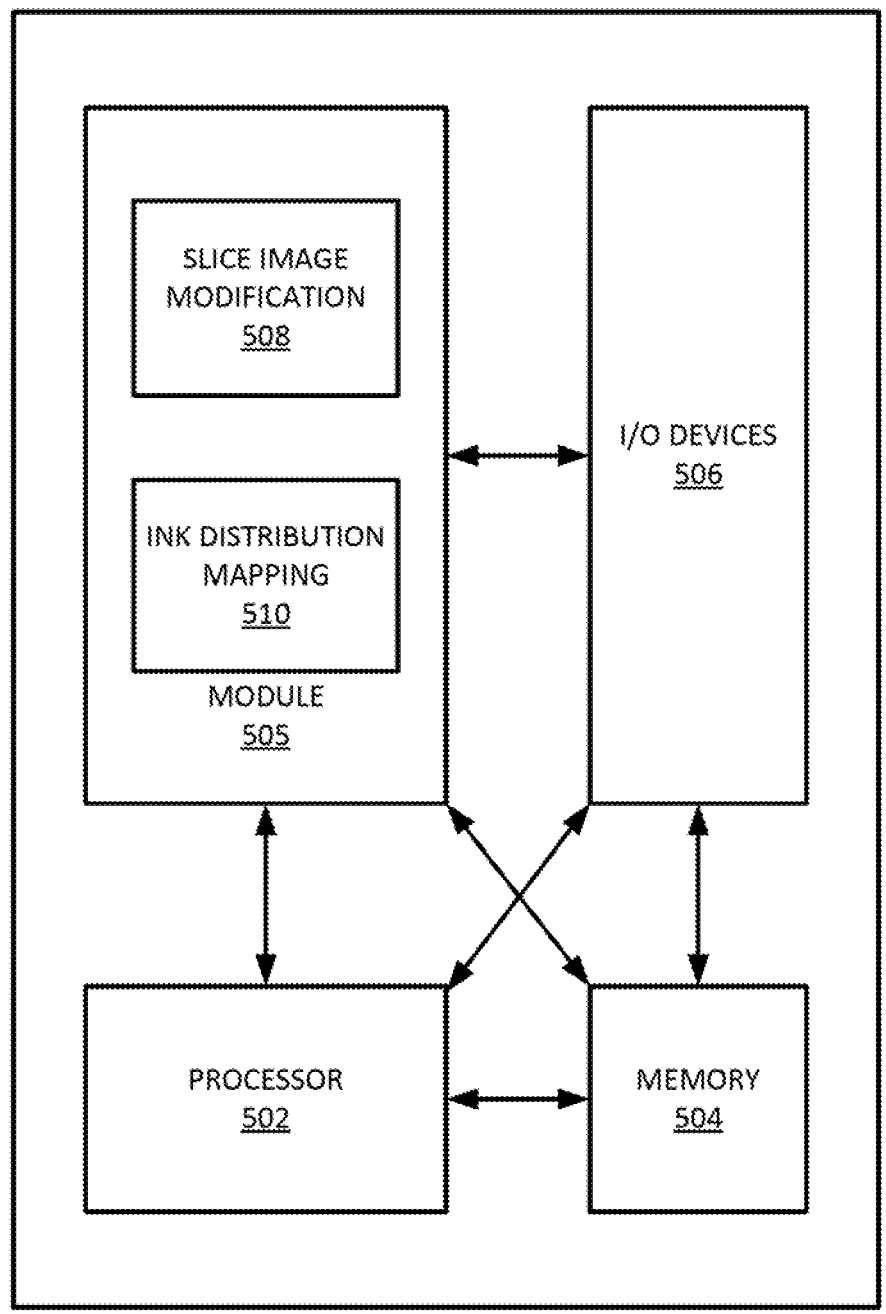
FIG. 5 depicts a high-level block diagram of an example computer that can be transformed into a machine capable of performing the functions described herein.

FIG. 5 depicts a high-level block diagram of an example computer that can be transformed into a machine capable of performing the functions described herein. Notably, no computer or machine currently exists that performs the functions as described herein. As a result, the examples of the present disclosure modify the operation and functioning of the general-purpose computer to perform additive manufacturing using fusing and non-fusing printing fluids, as disclosed herein.

As depicted in FIG. 5, the computer 500 comprises a hardware processor element 502, e.g., a central processing unit (CPU), a microprocessor, or a multi-core processor, a memory 504, e.g., random access memory (RAM) and/or read only memory (ROM), a module 505 for performing additive manufacturing using fusing and non-fusing printing fluids, and various input/output devices 506, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 505 for performing additive manufacturing using fusing and non-fusing printing fluids, e.g., machine readable instructions can be loaded into memory 504 and executed by hardware processor element 502 to implement the blocks, functions or operations as discussed above in connection with the method 200. For instance, the module 505 may include a plurality of programming code components, including a slice image modification component 508 and an ink distribution mapping component 510.

The slice image modification component 508 may be configured to modify a slice image or portion of a model for an object to include a sacrificial artifact. For instance, the slice image modification component 508 may be configured to convert an original slice image for an object, such as the slice image illustrated in FIG. 3A, to a corresponding disguised slice image that includes both the object and a sacrificial artifact, such as the slice image illustrated in FIG. 3B.

The ink distribution mapping component 510 may be configured to generate an ink distribution map for a pass of an additive manufacturing process, based on a slice image that uses both fusing and non-fusing printing fluids. For instance, the ink distribution mapping component 510 may be configured to generate an ink distribution map such as that illustrated in FIG. 3C.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 505 for performing additive manufacturing using fusing and non-fusing printing fluids, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
generating, by a processing system of an additive manufacturing system, a model for fabricating a plurality of objects, wherein the model includes a first region defining each one of the plurality of objects and a second region defining a sacrificial artifact that forms a boundary with un-fused powder around each one of the plurality of objects formed with fused powder; and
controlling, by the processing system, the print engine to fabricate the sacrificial artifact simultaneously with fabricating the plurality of objects, wherein at least one of the plurality of objects is printed using a first colored fusing printing fluid, a second colored fusing printing fluid, a first colored non-fusing printing fluid, and a second colored non-fusing printing fluid, wherein the first colored fusing printing fluid and the first colored non-fusing printing fluid have a same color and the second colored fusing printing fluid and the second colored non-fusing printing fluid have a same color, wherein the first colored fusing printing fluid and the first colored non-fusing printing fluid are a different color from the second colored fusing printing fluid and the second colored non-fusing printing fluid, wherein the first colored fusing printing fluid is used on a first portion of an object of the plurality of objects and the first colored non-fusing printing fluid is used adjacent to the first colored fusing printing fluid, and wherein a second colored fusing printing fluid is used on a second portion of the object and the second colored non-fusing printing fluid is used adjacent to the second colored fusing printing fluid to hide a number of the plurality of objects that are printed as well as a geometry of each one of the plurality of objects, wherein the second region formed around the boundary of each one of the plurality of objects comprises:
a buffer portion that directly physically contacts the first region and is fabricated using the non-fusing printing fluid; and
an additional portion that directly physically contacts the buffer portion without directly physically contacting the first region, where the additional portion is fabricated using the fusing printing fluid.

2. The method of claim 1, wherein the fabricating the sacrificial artifact is performed using a combination of the non-fusing printing fluid and a fusing printing fluid.

3. The method of claim 1, wherein the fusing printing fluid causes a powder to fuse when exposed to a quantity energy, but the non-fusing printing fluid prevents the powder from fusing when exposed to the quantity of energy.

4. The method of claim 3, wherein the non-fusing printing fluid comprises a cooling agent.

5. The method of claim 3, wherein the non-fusing printing fluid comprises an agent that chemically weakens a fusing process.

6. The method of claim 3, wherein the non-fusing printing fluid comprises an agent that physically weakens a fusing process.

7. The method of claim 3, wherein the non-fusing printing fluid comprises an agent that breaks down a fused solid material after fusing.

* * * * *